(12) United States Patent
Takuma (10) Patent No.: US 7,000,487 B2
(45) Date of Patent: Feb. 21, 2006

(54) MAGNETIC STEERING ANGLE DETECTION APPARATUS

(75) Inventor: Emi Takuma, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/659,269

(22) Filed: Sep. 11, 2003

(65) Prior Publication Data

US 2004/0118220 A1    Jun. 24, 2004

(30) Foreign Application Priority Data

Dec. 19, 2002   (JP) ........................... P2002-368066

(51) Int. Cl.
*G01L 3/02*   (2006.01)
(52) U.S. Cl. ............................... 73/862.333
(58) Field of Classification Search ........... 73/862.332, 73/862.331, 862.333, 862.335
See application file for complete search history.

(56) References Cited

U.S. PATENT DOCUMENTS

| | | | | |
|---|---|---|---|---|
| 3,634,946 A | * | 1/1972 | Star ........................... | 33/356 |
| 5,386,372 A | * | 1/1995 | Kobayashi et al. ......... | 700/280 |
| 5,930,905 A | * | 8/1999 | Zabler et al. ................ | 33/1 PT |
| 6,404,084 B1 | * | 6/2002 | Niki et al. ................. | 310/75 R |
| 6,472,657 B1 | * | 10/2002 | Miles et al. ........... | 250/231.15 |
| 6,577,030 B1 | * | 6/2003 | Tominaga et al. ........ | 310/68 B |
| 6,707,293 B1 | * | 3/2004 | Wan et al. ............. | 324/207.25 |
| 2005/0127907 A1 | * | 6/2005 | Shiraga et al. ......... | 324/207.25 |

FOREIGN PATENT DOCUMENTS

JP            11-500828        1/1999

* cited by examiner

*Primary Examiner*—Max Noori
(74) *Attorney, Agent, or Firm*—Finnegan, Henderson, Farabow, Garrett & Dunner, L.L.P.

(57) ABSTRACT

A magnetic steering angle detection apparatus includes a magnet rotating in synchronization with a steering shaft mounted on a vehicle, senses a change of a magnetic field from the magnet by use of a hall IC mounted on a column side, and detects a rotation angle of the steering shaft. The magnet has S and N poles arranged on a plane of which normal line is in a substantially axial direction of the steering shaft. The hall IC is disposed such that a sensing direction of the hall IC is set to be a substantially single direction and the sensing direction is made to substantially coincide with the axial direction of the steering shaft.

6 Claims, 7 Drawing Sheets

MAGNETIC STEERING ANGLE DETECTION APPARATUS

BACKGROUND OF THE INVENTION

1. Field of the Invention

The present invention relates to a magnetic steering angle detection apparatus for detecting a steering angle of a vehicle steering, and particularly, to a technology for reducing an influence from an external magnet.

2. Description of the Related Art

Figure 1:
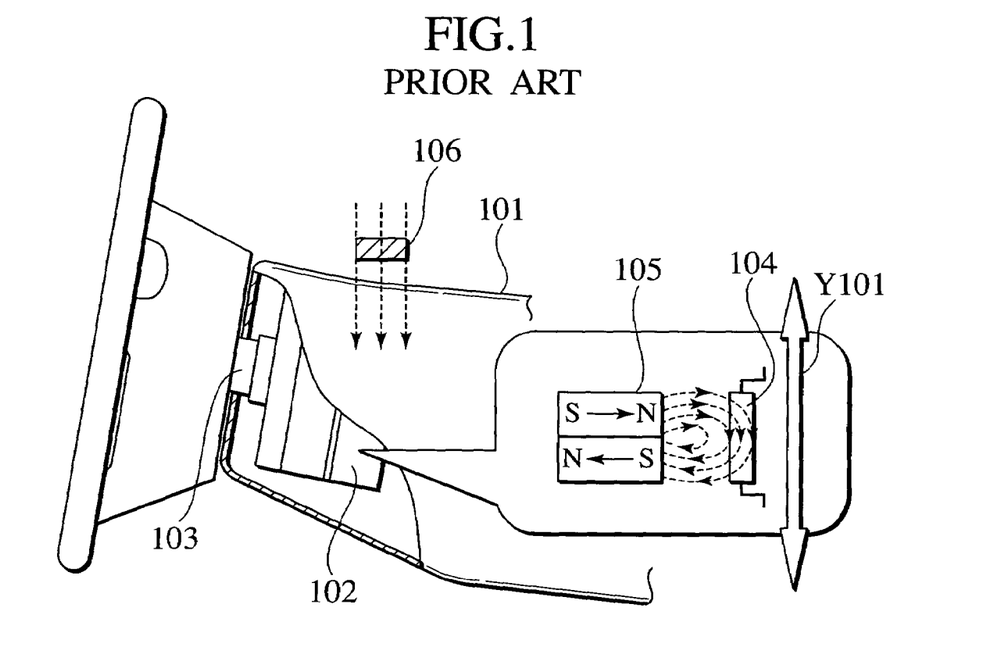
FIG. 1 is an explanatory view showing a configuration of a conventional magnetic steering angle sensor.

As a conventional example of a steering angle detection apparatus mounted on a vehicle, one described in a Japanese Patent Translation Publication No. Hei 11-500828 (published in 1999) is known. In this document, as shown in FIG. 1, the steering angle detection apparatus 102 is mounted in the column cover 101. The steering angle detection apparatus 102 detects the rotation angle of the angle detection magnet 105 rotating in synchronization with the steering shaft 103 by means of the anisotropic magnetoresistive element (hereinafter, referred to as AMR) 104, thus computing the rotation angle of the steering shaft 103.

In this case, the AMR 104 is configured to detect the rotation angle of the angle detection magnet 105 by sensing a magnetic field in a direction orthogonal to the steering shaft 103, that is, in a direction shown by the arrow Y101.

At this time, when a driver carries the magnet (magnetized object) 106 to the inside of the vehicle and places the magnet 106 close to the column cover 101, a magnetic field is sometimes generated in the direction orthogonal to the steering shaft 103 (direction of the arrow Y101). By this magnetic field, a misdetection of a measured angle by the AMR 104 occurs in some case. In such a case, this misdetection results in a miscomputation of the steering angle.

For example, a steering angle detection apparatus, which is configured such that a keyholder fixing magnet is mounted on the side face of a column switch, is affected by this fixing magnet, and consequently, a measure for shielding the apparatus from the external magnetic field becomes required. Although a method of providing a magnetic shield can be considered to be a measure for shielding the apparatus from the external magnetic field, the use of this method increases the number of parts, thus causing the problem of increase in size and cost of the apparatus.

SUMMARY OF THE INVENTION

As described above, the conventional magnetic steering angle detection apparatus has involved a problem that, when the magnet 106 is placed in the vicinity of the column cover 101, the AMR 104 for sensing the steering angle senses a magnetic component by this magnet 106, thus decreasing an accuracy in detecting the steering angle.

Moreover, though a method of magnetically shielding the periphery of the AMR 104 can be considered in order to solve the above problem, this method has involved the problem of increase in size and cost of the apparatus.

The present invention has been created in order to solve the conventional subject described above. It is an object of the present invention to provide a magnetic steering angle detection apparatus capable of reducing an influence from an external magnet by means of a simple configuration.

In order to achieve the foregoing object, the present invention provides a magnetic steering angle detection apparatus, including a magnet rotating in synchronization with a steering shaft mounted on a vehicle, and a magnetic sensor mounted on a column side, the magnetic sensor configured to detect a rotation angle of the steering shaft by sensing a change of a magnetic field from the magnet. Here, the magnet has S and N poles arranged on a plane of which normal line is in a substantially axial direction of the steering shaft, and the magnetic sensor is disposed such that a sensing direction thereof is set to be a substantially single direction and the sensing direction is made to substantially coincide with the axial direction of the steering shaft.

Moreover, from another aspect, the present invention provides a magnetic steering angle detection apparatus, including a first gear rotating in synchronization with a steering shaft mounted on a vehicle, a second gear rotating in synchronization with the first gear at a speed faster than a speed of the first gear, a third gear rotating in synchronization with the first gear at a speed slower than a speed of the second gear, magnets rotating in synchronization with the second and third gears, respectively, magnetic sensors provided on column sides and in vicinities of the magnets of the second and third gears, respectively, the magnetic sensors configured to sense changes of magnetic fields from the magnets of the second and third gears, and a computation unit configured to compute a rotation angle of the steering shaft by detecting rotation angles of the second and third gears based on sensing signals from the magnetic sensors. Here, each of the magnets provided on the second and third gears has S and N poles arranged on a plane of which normal line is in a substantially axial direction of the steering shaft, and each of the magnetic sensors is disposed such that a sensing direction thereof is set to be a substantially single direction and the sensing direction is made to substantially coincide with the axial direction of the steering shaft.

It is preferable that the magnetic sensors be provided on positions where components of the magnetic fields from the magnets in the axial direction of the steering shaft are detectable.

It is preferable that the magnetic sensors be hall ICs, each of which is formed of a plurality of hall elements.

The magnetic steering angle detection apparatus according to the present invention computes the rotation angles of the magnets (rotation angle detection magnet, reference signal detection magnet) by use of the magnetic sensors (hall ICs) in which the sensing directions are directed to the axial direction of the steering shaft, and calculates the steering angle based on these rotation angles. Hence, even if an external magnet is placed in the vicinity of the column cover, an influence of a magnetic field from the external magnet can be reduced, thus making it possible to compute the steering angle with high accuracy.

Moreover, because it in not necessary to provide a shield for shielding the apparatus from the magnetic field by the external magnet, the configuration of the apparatus can be simplified, and cost reduction thereof can be achieved.

BRIEF DESCRIPTION OF THE DRAWINGS

FIGS. 6A and 6B are explanatory views showing magnetization directions of magnets: FIG. 6A shows a diameter directional magnetization; and FIG. 6B shows a planar magnetization.

DETAILED DESCRIPTION OF THE PREFERRED EMBODIMENT

Figure 2:
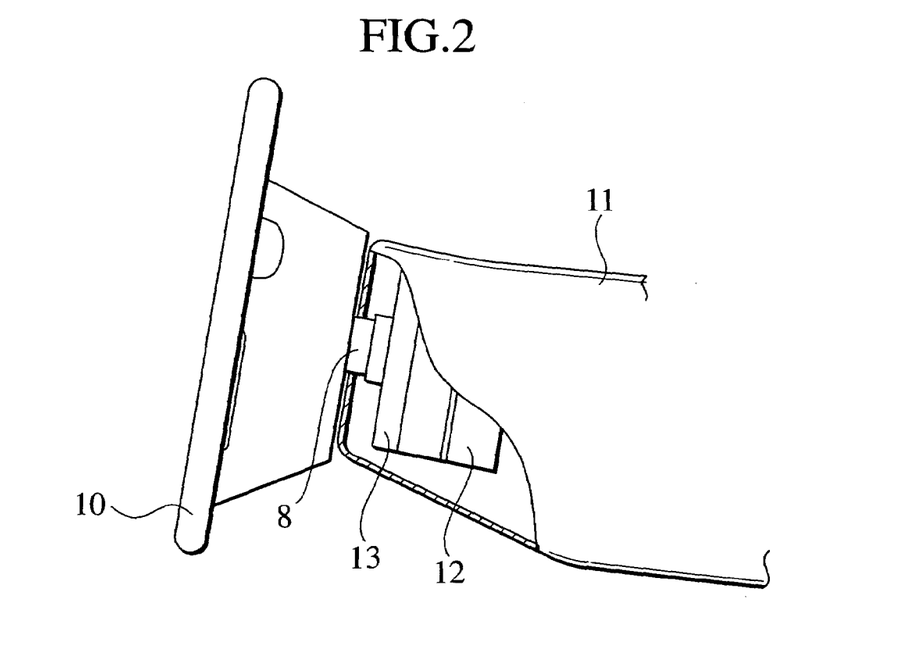
FIG. 2 is a side view showing a state in a vicinity of a steering in which a magnetic steering angle detection apparatus according to an embodiment of the present invention is mounted.
Figure 3:
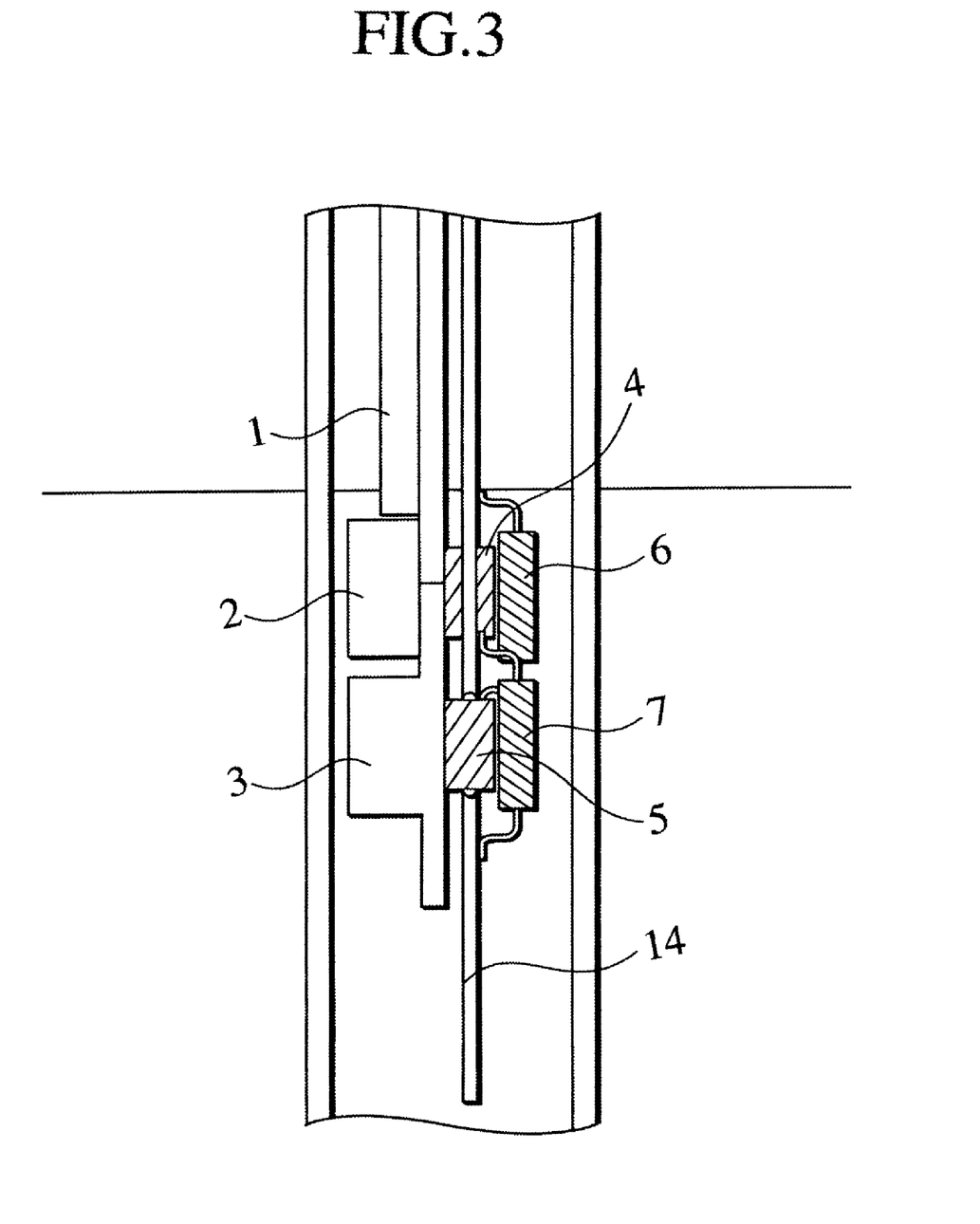
FIG. 3 is a side view showing a configuration of a magnetic steering angle sensor according to the embodiment of the present invention.
Figure 4:
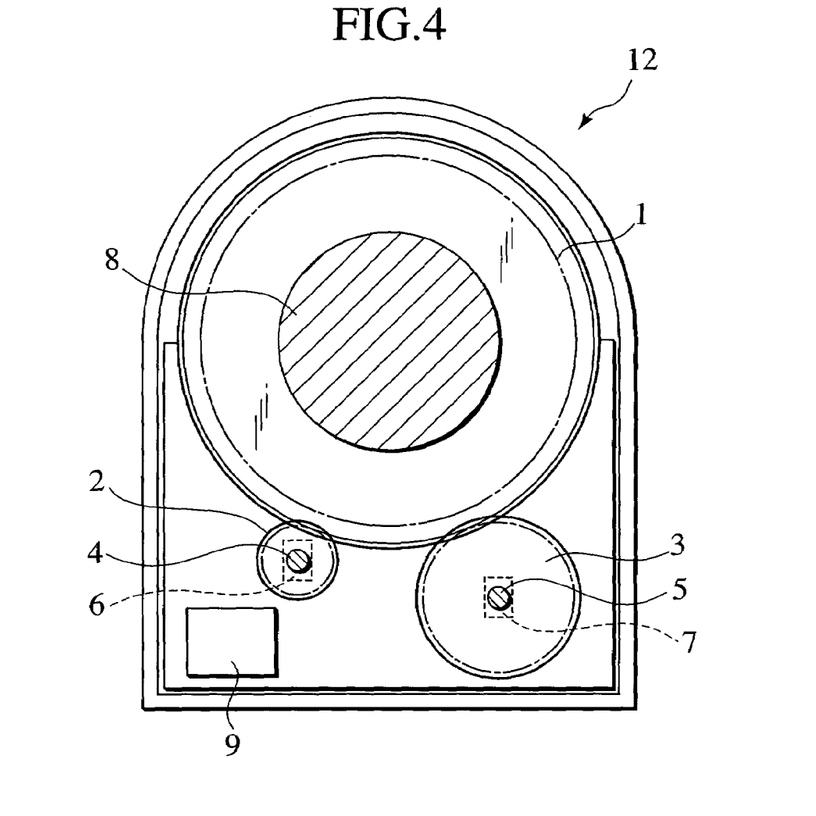
FIG. 4 is a plan view showing the configuration of the magnetic steering angle sensor according to the embodiment of the present invention.

An embodiment of the present invention will be described below based on the drawings. FIG. 2 shows a side view of a steering portion in which a magnetic steering angle detection apparatus according to an embodiment of the present invention is mounted. FIG. 3 shows an explanatory view showing details of the portion of the steering angle detection apparatus 12 shown in FIG. 2. FIG. 4 shows a plan view of the steering angle detection apparatus 12.

As shown in FIGS. 2 and 3, this steering angle detection apparatus 12 is provided around the steering shaft 8 and below the spiral cable 13 in the column cover 11 of a vehicle.

Then, as shown in FIG. 4, the steering angle detection apparatus 12 includes the first gear 1 provided coaxially with the steering shaft 8, the second gear 2 of which number of teeth is smaller than that of the first gear 1, the second gear 2 meshing with the first gear 1, and the third gear 3 of which number of teeth is smaller than that of the first gear 1 and larger than that of the second gear 2, the third gear 3 meshing with the first gear 1.

Hence, when the steering wheel 10 shown in FIG. 2 is rotationally operated, the steering shaft 8 and the first gear 1 are rotationally driven accompanied with this operation. Moreover, the second and third gears 2 and 3 meshing with the first gear 1 are rotationally driven.

The rotation angle detection magnet 4 of 2-pole magnetization is attached onto the rotation shaft of the second gear 2. The hall IC (magnetic sensor) 6 for sensing a change of a magnetic field is disposed on a fixed side (column side) opposite to the rotation angle detection magnet 4. When the second gear 2 and the rotation angle detection magnet 4 rotate to change the magnetic field, this change of the magnetic field is sensed by the hall IC 6.

Moreover, the reference signal detection magnet 5 of 2-pole magnetization is attached onto the rotation shaft of the third gear 3, and the hall IC (magnetic sensor) 7 for sensing a change of the magnetic field is disposed on a fixed side (column side) opposite to the reference signal detection magnet 5. When the third gear 3 and the reference signal detection magnet 5 rotate to change the magnetic field, this change of the magnetic field is sensed by the hall IC 7.

Furthermore, sense data of the respective hall ICs 6 and 7 are supplied to the angle computation processing microcomputer 9, where a steering angle is calculated.

In addition, the numbers of teeth of the respective gears 1, 2 and 3 are set such that the rotation angle of the first gear 1 when the second gear 2 makes one turn and the rotation angle of the gear 1 when the third gear 3 makes one turn are different from each other. For example, the second gear 2 is set to make one turn (360-degree rotation) when the first gear 1 rotates by 64 degrees and the third gear 3 is set to make one turn (360-degree rotation) when the first gear 1 rotates by 180 degrees.

Moreover, if the total steering angle of the steering wheel 10 is, for example, ±1080 degrees, the second gear 2 will make approximate 34 turns. The third gear 3 is set such that the angle thereof differs for each of the 34 turns. Hence, if the rotation angles of the second and third gears 2 and 3 are detected, then an absolute steering angle of the steering wheel 10 can be computed.

Figure 5:
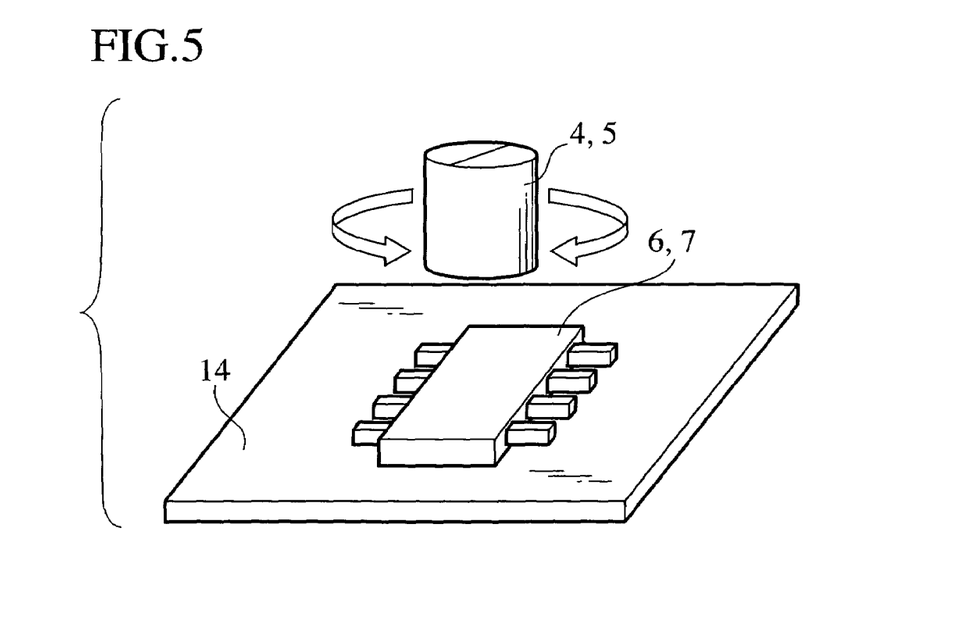
FIG. 5 is an explanatory view showing a positional relationship between a magnet and a hall IC.

FIG. 5 is an explanatory view showing a positional relationship between the rotation angle detection magnet 4 and the hall IC 6, and a positional relationship between the reference signal detection magnet 5 and the hall IC 7. As shown in the drawing, each of the magnets 4 and 5 is disposed at a position opposite to each of the hall ICs 6 and 7 mount onto the board 14. The changes of the magnetic fields, which are caused by the rotations of the magnets 4 and 5, are sensed by the hall ICs 6 and 7, and thus, the rotation angles of the magnets 4 and 5, that is, the rotation angles of the second and third gears 2 and 3 are computed.

Figure 6A:
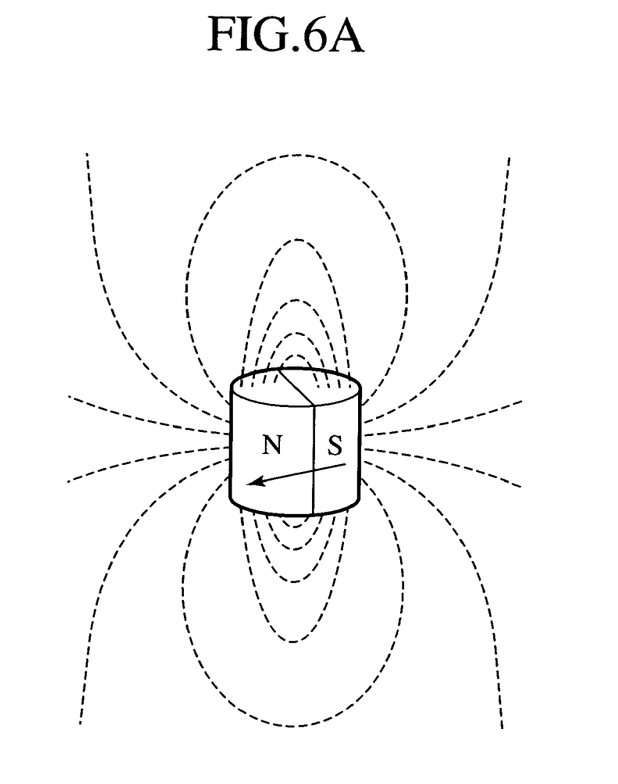
Figure 6B:
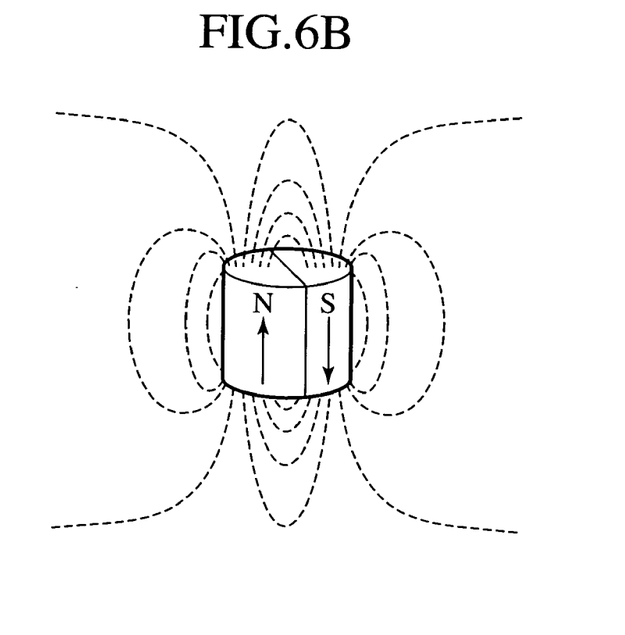

In this case, the hall ICs 6 and 7 are set such that sensing directions thereof are orthogonal to the surfaces of the packages of the hall ICs 6 and 7, that is, the normal direction of the package surfaces. The hall ICs 6 and 7 sense magnetic components in the normal direction among the magnetic fields emitted from the magnets 4 and 5 of 2-pole magnetization, thus detecting the rotation angles of the magnets 4 and 5. The magnetization directions of these magnets are as shown in FIGS. 6A and 6B. Specifically, FIG. 6A shows the case of a diameter directional magnetization, and FIG. 6B shows a planar magnetization. Each of the hall ICs 6 and 7 is disposed such that the sensing direction thereof is set to be a substantially single direction and the sensing direction is made to substantially coincide with the axial direction of the steering shaft 8.

Figure 7:
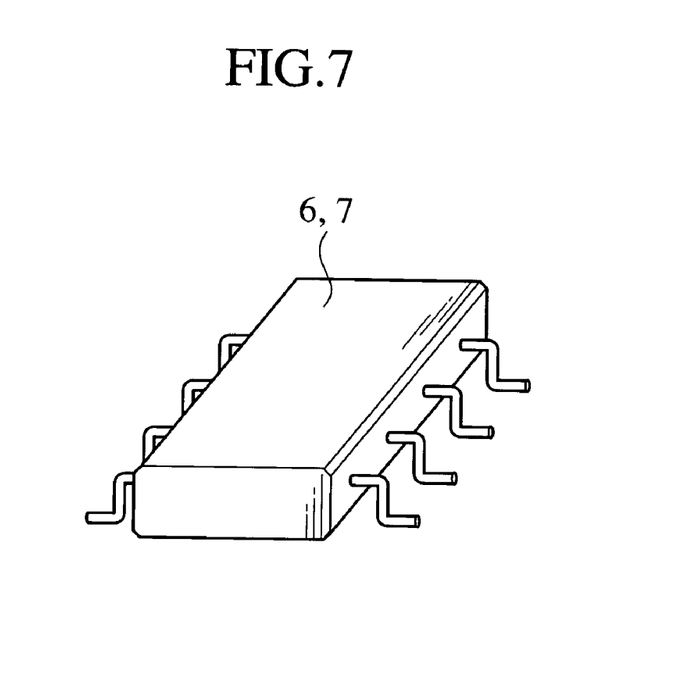
FIG. 7 is an appearance view of a hall IC.
Figure 8:
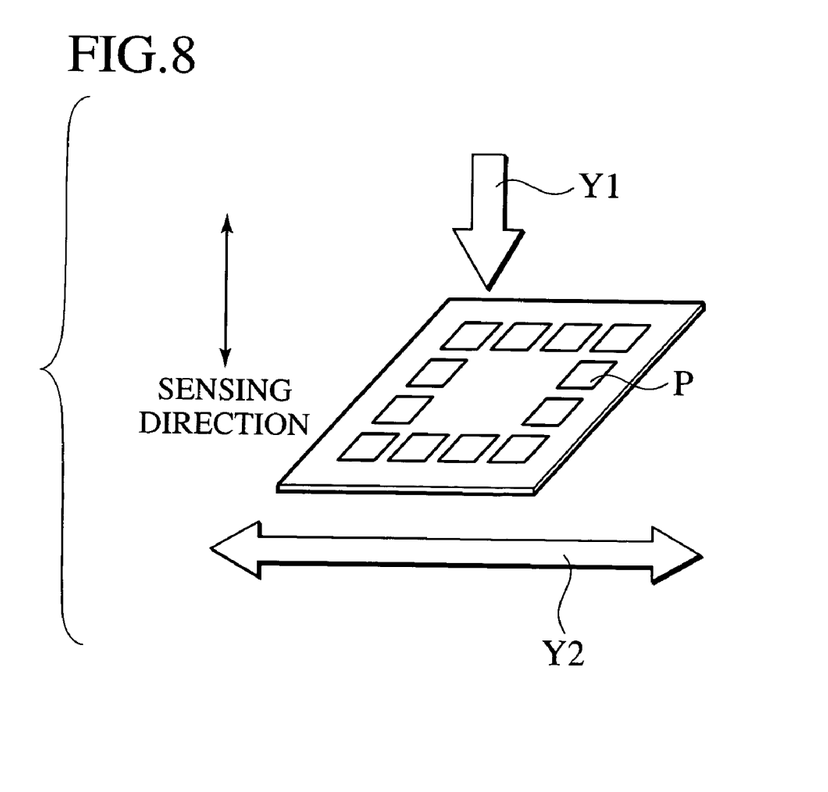
FIG. 8 is an explanatory view showing a direction (sensing direction) where the hall IC senses a magnetic field and a direction where the hall IC does not sense the magnetic field.

Specifically, each of the hall ICs 6 and 7 has a package as shown in FIG. 7, and is configured such that the plurality of hall elements p are arranged in an array as shown in FIG. 8. Each of the hall ICs 6 and 7 senses a magnetic field in the direction (direction of the arrow Y1 in the drawing) orthogonal to the package surface thereof, and does not sense a magnetic field in a direction (direction of the arrow Y2 in the drawing) parallel to the package surface.

FIG. 9(b) is an explanatory view schematically showing a state in the above case. As shown in the drawing, the magnetic line of force coupling the S and N poles of each of the magnets 4 and 5 has an approximate U shape. A distance between each of the hall ICs 6 and 7 and each of the magnets 4 and 5 is set such that a component (hereinafter, referred to as Z axis directional component) orthogonal to the surface of each of the hall ICs 6 and 7 in the magnetic line of force intersects each of the hall ICs 6 and 7.

Figure 9:
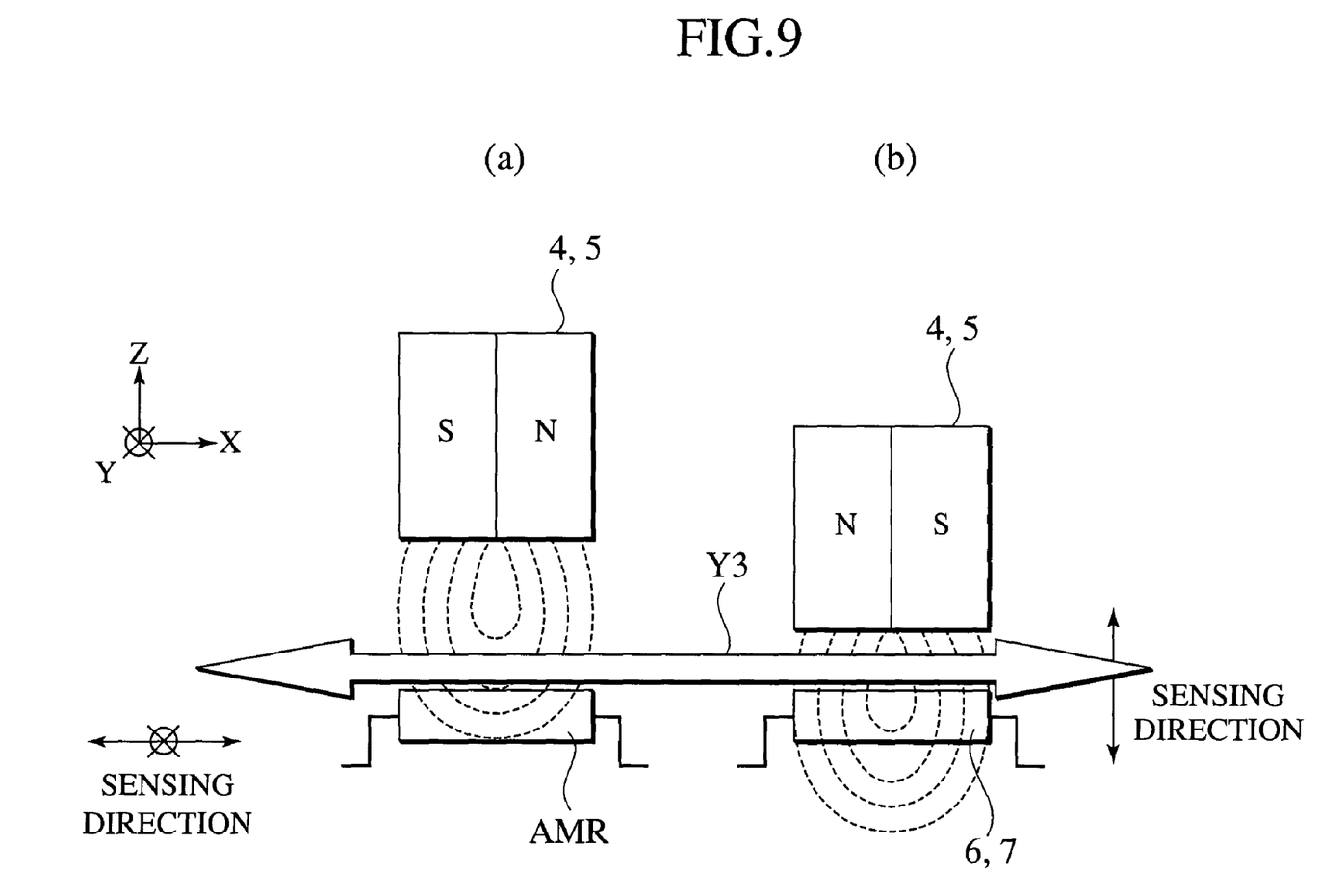
FIG. 9(a) is an explanatory view showing a relationship between a conventional AMR and a magnetic field emitted from the magnet.
FIG. 9(b) is an explanatory view showing a relationship between the hall IC and the magnetic field emitted from the magnet.

Note that FIG. 9(a) is an explanatory view showing an arranging relationship between each of the magnets 4 and 5 and the anisotropic magnetoresistive (AMR) element in the case of utilizing the same element used in the conventional example. As shown in the drawing, the conventional anisotropic magnetoresistive element senses a component of a magnetic field in a direction parallel to the package of the element. Consequently, the conventional element is placed at a position somewhat apart from the magnet as compared with the case shown in FIG. 9(b). Moreover, the arrow Y3 in FIG. 9 represents an external magnetic field. It can be understood that, when a magnetic field in the direction of the arrow Y3 is applied from the outside, the AMR shown in FIG. 9(a) is affected by this magnetic field, whereas each of the hall ICs 6 and 7 is not affected by the magnetic field.

Next, the operation of the steering angle detection apparatus 12 according to this embodiment will be described. When an operator rotationally operates the steering wheel 10 shown in FIG. 2, the steering shaft 8 rotates, and the first gear 1 coupled thereto rotates.

Then, as shown in FIGS. 3 and 4, the second and third gears 2 and 3 meshing with the first gear 1 rotate. In this case, because the second gear 2 is set smaller in diameter than the third gear 3, the second gear 2 will rotate faster than the third gear 3.

When the rotation angle detection magnet 4 attached onto the second gear 2 rotates, the hall IC 6 senses the Z axis directional component of the magnetic field emitted from the rotation angle detection magnet 4, and based on a result of this sense, the rotation angle of the second gear 2 is computed.

In a similar way to the above, when the reference signal detection magnet 5 attached onto the third gear 3 rotates, the hall IC 7 senses the Z axis directional component of the magnetic field emitted from the reference signal detection magnet 5, and based on a result of this sense, the rotation angle of the third gear 3 is computed.

Thereafter, the absolute steering angle of the steering wheel 10 is calculated based on the rotation angles of the second and third gears 2 and 3.

In such a way, the rotation angles of the second and third gears 2 and 3 are detected, and it is made possible to compute the absolute steering angle based on the results of these detections.

In this case, the two hall ICs 6 and 7 are configured to sense the magnetic fields (Z axis directional components) in the direction orthogonal to the packages of the hall ICs 6 and 7, and therefore, the hall ICs 6 and 7 will sense the magnetic fields directed to the axial direction of the steering shaft 8. Hence, the hall ICs 6 and 7 are hardly affected by the external magnetic field. This will be described below while referring to FIG. 10.

As described above, the hall ICs 6 and 7 sense the magnetic fields in the direction orthogonal to the packages thereof. Accordingly, the hall ICs 6 and 7 do not sense magnetic field components by magnets placed at the positions of the reference numerals 21, 22 and 23 in FIG. 10, but will sense a magnetic field component by a magnet placed at the position of the reference numeral 24.

Figure 10:
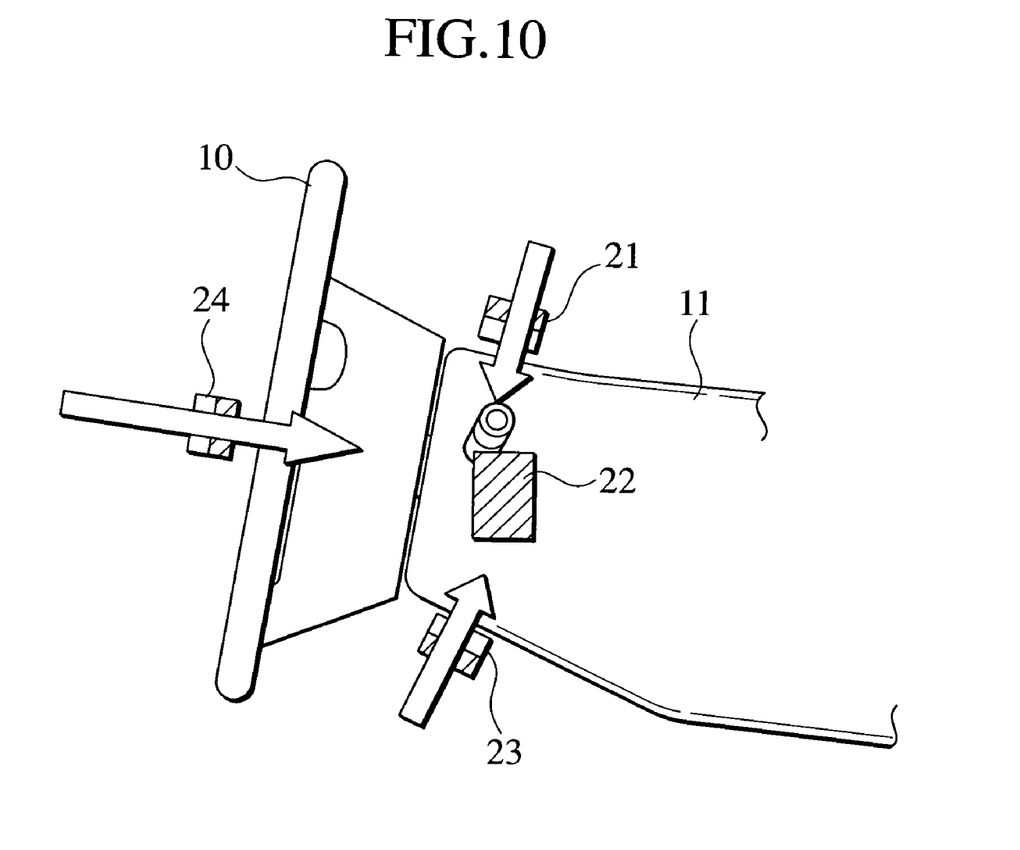
FIG. 10 is an explanatory view showing an influence of external magnets.

Here, the magnet placed at the position of the reference numeral 24 is largely separated from the steering angle detection apparatus 12 disposed in the column cover 11 due to the existence of the steering wheel 10. Accordingly, the magnetic field emitted from the magnet 24 does not reach the positions where the hall ICs 6 and 7 are attached. Hence, even if a magnet is placed at the position of the reference numeral 24, the hall ICs 6 and 7 are not affected by the magnetic field emitted from this magnet. Consequently, the hall ICs 6 and 7 can avoid being affected by the external magnet.

In such a way, in the magnetic steering angle detection apparatus according to this embodiment, the hall ICs 6 and 7 are used in order to sense the rotation angle of the rotation angle detection magnet 4 attached onto the second gear 2 and the rotation angle of the reference signal detection magnet 5 attached onto the third gear 3. Moreover, the hall ICs 6 and 7 are arranged such that the normal direction (direction orthogonal to the packages) of the package surfaces thereof are made to substantially coincide with the axial direction of the steering shaft 8. Accordingly, even if the external magnet is placed in the vicinity of the steering shaft 8, the influence of the magnetic field emitted from the external magnet can be prevented, and the detection accuracy of the steering angle can be enhanced.

In addition, because it is not necessary to provide a shield for avoiding the influence from the external magnet, the apparatus can be miniaturized and reduced in cost.

As above, the magnetic steering angle detection apparatus of the present invention has been described based on the illustrated embodiment. However, the present invention is not limited to the embodiment, and the respective units of the configuration can be replaced by ones having similar functions and being configured arbitrarily.

For example, though the foregoing embodiment is configured such that the second and third gears 2 and 3 meshing with the first gear 1 are used and the rotation angle of the steering shaft 8 is detected by sensing the rotation angles of the second and third gears 2 and 3, the present invention is not limited to this configuration.

What is claimed is:

1. A magnetic steering angle detection apparatus, comprising:
   magnets rotating at different speeds in synchronization with a steering shaft mounted on a vehicle; and
   magnetic sensors mounted adjacent respective magnets, the magnetic sensors configured to detect a rotation angle of the steering shaft by sensing a change of a magnetic field emitted from the magnets,
   wherein each magnet has S and N poles arranged on a plane of which a normal line is in a substantially axial direction of the steering shaft; and
   each magnetic sensor is disposed such that a sensing direction thereof is set to be a substantially single direction coinciding with the axial direction of the steering shaft.

2. A magnetic steering angle detection apparatus, comprising:
   a first gear rotating in synchronization with a steering shaft mounted on a vehicle;
   a second gear rotating in synchronization with the first gear at a speed faster than a speed of the first gear;
   a third gear rotating in synchronization with the first gear at a speed slower than a speed of the second gear;
   magnets rotating in synchronization with the second and third gears, respectively;
   magnetic sensors provided in vicinities of the magnets of the second and third gears, respectively, the magnetic sensors configured to sense changes of magnetic fields from the magnets of the second and third gears; and
   a computation unit configured to compute a rotation angle of the steering shaft by detecting rotation angles of the second and third gears based on sensing signals from the magnetic sensors,
   wherein each of the magnets provided on the second and third gears has S and N poles arranged on a plane of which normal is in a substantially axial direction of the steering shaft; and
   each of the magnetic sensors is disposed such that a sensing direction thereof is set to be a substantially single direction and the sensing direction is made to substantially coincide with the axial direction of the steering shaft.

3. The magnetic steering angle detection apparatus according to claim 1, wherein each magnetic sensor is provided on a position where a component of the magnetic field from the magnet in the axial direction of the steering shaft is detectable.

4. The magnetic steering angle detection apparatus according to claim 2, wherein the magnetic sensors are provided on positions where components of the magnetic fields from the magnets in the axial direction of the steering shaft are detectable.

5. The magnetic steering angle detection apparatus according to claim 1, wherein each magnetic sensor is a hall IC formed of a plurality of hall elements.

6. The magnetic steering angle detection apparatus according to claim 2, wherein the magnetic sensors are hall ICs, each of which is formed of a plurality of hall elements.

* * * * *